(12) United States Patent
Weinfeld et al.

(10) Patent No.: US 11,856,683 B2
(45) Date of Patent: Dec. 26, 2023

(54) HIGH EFFICIENCY PLASMA CREATION SYSTEM AND METHOD

(71) Applicant: N.T. TAO LTD., Tel Aviv (IL)

(72) Inventors: Doron Weinfeld, Jerusalem (IL); Boaz Weinfeld, Jerusalem (IL); Oded Gour Lavie, Ein Iron (IL)

(73) Assignee: N.T. TAO LTD., Tel Aviv (IL)

( * ) Notice: Subject to any disclaimer, the term of this patent is extended or adjusted under 35 U.S.C. 154(b) by 0 days.

(21) Appl. No.: 17/773,819

(22) PCT Filed: Dec. 27, 2021

(86) PCT No.: PCT/IL2021/051541
§ 371 (c)(1),
(2) Date: May 2, 2022

(87) PCT Pub. No.: WO2022/201140
PCT Pub. Date: Sep. 29, 2022

(65) Prior Publication Data
US 2023/0128652 A1    Apr. 27, 2023

(30) Foreign Application Priority Data

Mar. 22, 2021 (IL) .......................................... 281747

(51) Int. Cl.
*H05H 1/04*    (2006.01)
*H05H 1/16*    (2006.01)
*H05H 1/22*    (2006.01)

(52) U.S. Cl.
CPC .............. *H05H 1/04* (2013.01); *H05H 1/16* (2013.01); *H05H 1/22* (2013.01)

(58) Field of Classification Search
None
See application file for complete search history.

(56) References Cited

U.S. PATENT DOCUMENTS 3,039,014 A * 6/1962 Chieh ...................... H05H 1/22
376/128
3,156,622 A * 11/1964 Hill .......................... H05H 1/10
376/140
(Continued)

FOREIGN PATENT DOCUMENTS

AU    2007203057 A1    7/2007
CN    101018444 B      1/2011
(Continued)

OTHER PUBLICATIONS

International Search Report issued in PCT/IL2021/051541 dated Mar. 20, 2021 (6 pages).
(Continued)

*Primary Examiner* — Srinivas Sathiraju
(74) *Attorney, Agent, or Firm* — Smith, Gambrell & Russell, LLP

(57) ABSTRACT

A chamber cross-sectional multi-stage plasma arrangement characterized by escalating charge movement towards chamber center axis through one or more escalation stages contributing to the heating of the plasma, the centering of the plasma on the chamber axis, and creating rotation of the plasma therein. Rotation of the plasma around its axis induces a self-generated magnetic field, which in turn increases plasma stability and confinement. Some of the said stages of the multi-stage arrangement may be created by physical elements and components while others may be induced or generated by externally applying magnetic and/or electric fields or their combinations and/or by injection of electrons, ions or other plasma.

16 Claims, 13 Drawing Sheets

(56) References Cited

U.S. PATENT DOCUMENTS

| | | | |
|---|---|---|---|
| 3,166,477 A | 1/1965 | Hubert | |
| 3,324,316 A | 6/1967 | Cann | |
| 4,125,431 A | 11/1978 | Fowler | |
| 4,229,679 A | 10/1980 | Lode | |
| 4,252,608 A | 2/1981 | Baldwin | |
| 4,284,489 A * | 8/1981 | Weber | H01J 37/32174 315/276 |
| 4,314,879 A | 2/1982 | Hartman | |
| 4,368,092 A * | 1/1983 | Steinberg | H01J 37/32357 330/56 |
| 4,421,713 A | 12/1983 | Manheimer | |
| 4,548,782 A | 10/1985 | Manheimer | |
| 5,078,950 A | 1/1992 | Bernadet | |
| 5,147,596 A | 9/1992 | Weil | |
| 5,160,695 A | 11/1992 | Bussard | |
| 5,379,000 A * | 1/1995 | Brewer | H01J 49/0018 315/307 |
| 5,427,668 A * | 6/1995 | Sato | H01J 37/32422 118/723 HC |
| 5,518,547 A * | 5/1996 | Barnes | C23C 16/4401 118/723 MA |
| 5,522,934 A * | 6/1996 | Suzuki | C23C 16/455 118/723 MR |
| 5,529,657 A * | 6/1996 | Ishii | H01J 37/32642 156/915 |
| 5,571,366 A * | 11/1996 | Ishii | H01J 37/3299 216/60 |
| 5,614,055 A * | 3/1997 | Fairbairn | H01J 37/3244 204/298.37 |
| 5,745,537 A | 4/1998 | Verschoore | |
| 5,838,111 A * | 11/1998 | Hayashi | H05H 1/46 315/111.41 |
| 5,991,351 A | 11/1999 | Woolley | |
| 6,121,569 A | 9/2000 | Miley | |
| 6,320,334 B1 * | 11/2001 | Roberge | H01J 37/304 315/505 |
| 6,761,805 B1 * | 7/2004 | Shi | C23C 14/0605 204/298.12 |
| 6,764,575 B1 * | 7/2004 | Yamasaki | H01J 37/3408 156/345.46 |
| 9,462,669 B2 * | 10/2016 | Prater | H05H 1/16 |
| 10,670,960 B2 * | 6/2020 | Kirkpatrick | G03F 1/80 |
| 10,720,350 B2 * | 7/2020 | Nguyen | H01L 21/67253 |
| 11,501,956 B2 * | 11/2022 | White | H01J 37/32449 |
| 2002/0021118 A1 | 2/2002 | Roberge | H05H 7/02 324/76.78 |
| 2003/0006707 A1 | 1/2003 | Monkhorst | |
| 2004/0107909 A1 * | 6/2004 | Collins | H01J 37/32412 |
| 2006/0198485 A1 | 9/2006 | Binderbauer | |
| 2006/0254520 A1 * | 11/2006 | Rostoker | G21B 1/052 |
| 2007/0098129 A1 | 5/2007 | Edwards | |
| 2007/0158534 A1 * | 7/2007 | Monkhorst | H05H 1/14 250/214.1 |
| 2008/0187086 A1 * | 8/2008 | Bussard | H05H 3/06 376/127 |
| 2013/0175246 A1 * | 7/2013 | Hunt | H05H 1/16 219/121.59 |
| 2015/0097487 A1 * | 4/2015 | Prater | H05H 1/16 315/111.71 |
| 2015/0117583 A1 | 4/2015 | Pitsch | |
| 2015/0187443 A1 | 7/2015 | Tuszewski | |
| 2015/0294742 A1 | 10/2015 | Cohen | |
| 2016/0037617 A1 * | 2/2016 | Prater | H05H 1/16 315/111.71 |
| 2016/0276044 A1 | 9/2016 | Tuszewski | |
| 2017/0011811 A1 | 1/2017 | Slough | |
| 2017/0309351 A1 * | 10/2017 | Fenley | G21B 3/006 |
| 2017/0359886 A1 | 12/2017 | Binderbauer | |
| 2018/0047461 A1 | 2/2018 | Cohen | |
| 2018/0308663 A1 * | 10/2018 | Collins | H01J 37/32137 |
| 2018/0366233 A1 | 12/2018 | Wu | |
| 2019/0141827 A1 | 5/2019 | Gonzalez | |
| 2019/0295733 A1 | 9/2019 | Pais | |
| 2022/0406562 A1 * | 12/2022 | Brundage | H01J 37/023 |
| 2023/0128652 A1 * | 4/2023 | Weinfeld | H05H 1/16 315/111.71 |
| 2023/0212735 A1 * | 7/2023 | Nanjundappa | C23C 14/34 118/724 |

FOREIGN PATENT DOCUMENTS

| | | |
|---|---|---|
| CN | 110326366 A | 10/2019 |
| CN | 110945599 A | 3/2020 |
| GB | 862900 A | 3/1961 |
| GB | 873057 A | 7/1961 |
| GB | 918741 A | 2/1963 |
| GB | 1064047 A | 4/1967 |
| GB | 1083994 A | 9/1967 |
| GB | 2461267 A | 12/2009 |
| TW | 201828780 A | 8/2018 |
| WO | 1982/01457 A1 | 4/1982 |
| WO | 1998/19817 A1 | 5/1998 |
| WO | 1999/16291 A1 | 4/1999 |
| WO | 2002/05292 A2 | 1/2002 |
| WO | 2019/055400 A1 | 3/2019 |

OTHER PUBLICATIONS

Written Opinion issued in PCT/IL2021/051541 dated Mar. 20, 2021 (5 pages).
Miley, George H., "A Portable Neutron/tunable X-ray source based on inertial electrostatic confinement", Nucl. Instrum. Meth. Physics Res., A 422, 16-20, 1999.
TW Search Report dated May 23, 2023 in TW111110354 (1 page).

* cited by examiner

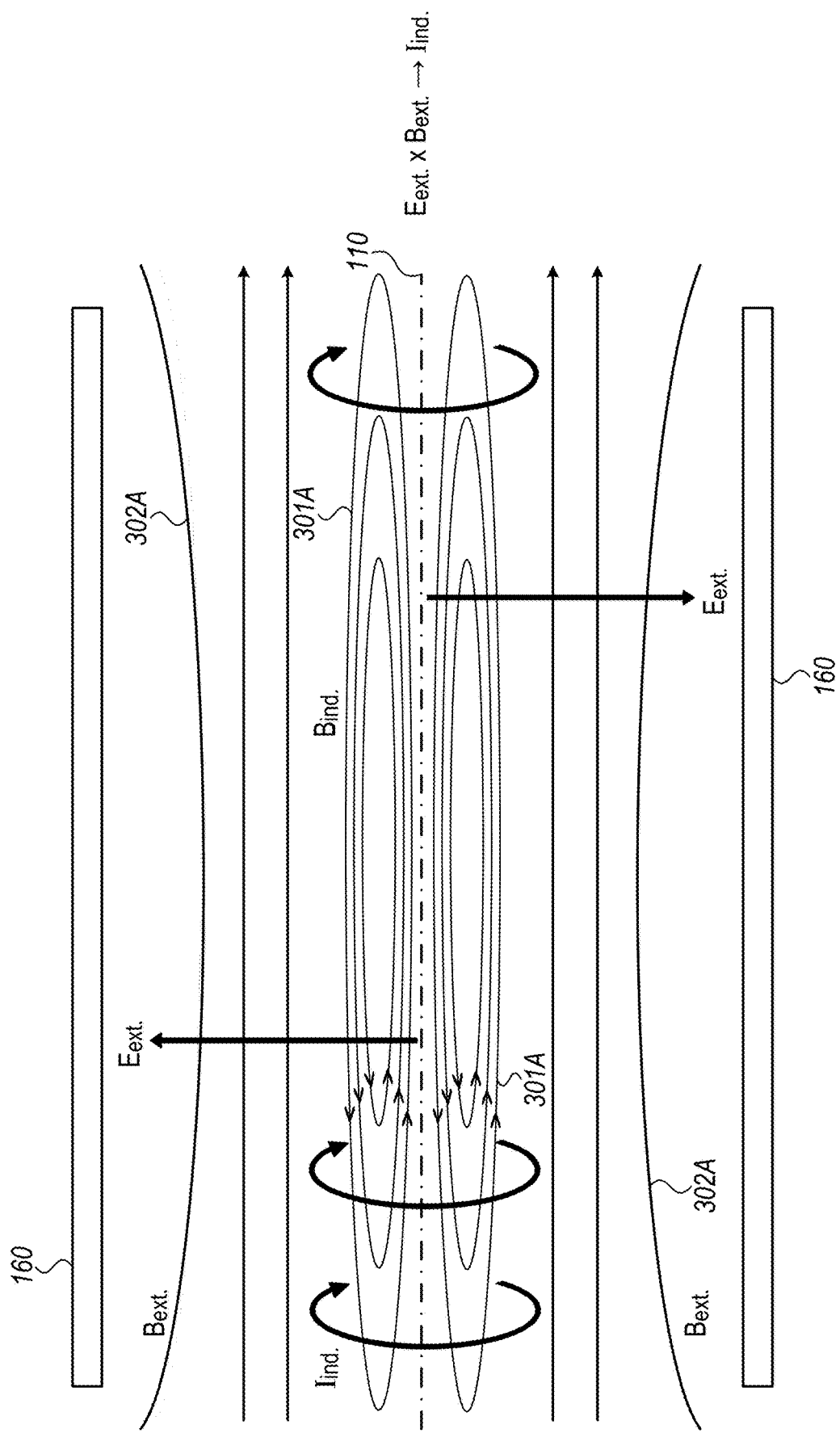

HIGH EFFICIENCY PLASMA CREATION SYSTEM AND METHOD

CROSS-REFERENCE TO RELATED APPLICATIONS

The present invention is filed under 35 U.S.C. § 371 as the U.S. national phase of International Application No. PCT/IL2021/051541, filed Dec. 27, 2021, which designated the U.S. and claims the right of priority of Israeli patent application 281747 filed with the Israeli Patent Office on Mar. 22, 2021. The entire disclosures of the above-identified priority applications are hereby fully incorporated herein by reference.

FIELD OF THE INVENTION

The present invention relates to a relatively small linear stable plasma confinement systems and methods for the harvesting of various types of products and effects derivable from such phenomena.

BACKGROUND OF THE INVENTION

Plasma is a highly ionized gas containing an approximately equal number of positive ions and electrons. A plasma is electrically conductive, and can, therefore, be manipulated by electrical or magnetic fields. Obtaining a stable plasma at such operable temperatures is a challenge much discussed in the art. Current systems and methods to such end are complex, require very large physical installations and do not present commonly commodified applicable means to harvest the widely known benefits and advantages of such phenomena.

Since plasma is an electrical conductor, it is possible to heat the plasma by inducing a current through it; the induced current that provides most of the poloidal field is also a major source of initial heating. The heating caused by the induced current is called ohmic (or resistive) heating. The generated heat depends on the resistance of the plasma and the amount of electric current running through it. But as the temperature of heated plasma rises, the resistance decreases and ohmic heating becomes less effective.

A great many number of plasma sources have been suggested and developed. The variety of plasma sources differ in the methods of plasma excitation and the geometry of the electrodes and plasma volume, which in turn, determine major parameters of the plasma.

Some such methods and systems consist of various gaseous components and mixtures thereof as an ion source which when coupled with an energy sources creates an ionized gas which is guided and or confined by magnets or any other means suitable for creating a magnetic field, wherein energizing the ions to the energy necessary for the intended reaction is obtainable in the prior art by different combinations of electric or magnetic fields, arrangements of electrodes and the like. Thus creating emission such as X-Rays, extreme UV, neutrons and the like.

The following are some terms and phenomena recognized in the relevant art:

Pinch—a current in the plasma can create a field that may be strong enough to self-confine the plasma while decreasing or totally removing the need for external magnets to confine the plasma. The possibility to perform a "pinch" in the plasma enables replacing the use of a toroidal shape with a cylindrical one. Instead of a large toroid, one could simply induce the current into a linear tube, which could cause the plasma within to collapse down into a filament. This has the advantage that the current in the plasma would heat it through normal resistive heating, but this configuration is considered in the prior art to be considerably limited in the attainable plasma temperature. However, as the plasma collapses, the adiabatic process would result in the temperature rising dramatically. Another way to create a pinch is by increasing the magnetic field in a very high pulse of current inside the coils that create the magnetic field. This pinch increases the pressure on the plasma and therefore increases the plasma density.

Magnetic Compression—A gas can be heated by sudden compression. In the same way, the temperature of a plasma is increased if it is compressed rapidly by increasing the confining magnetic field. Since plasma compression brings the ions closer together, the process has the additional benefit of facilitating attainment of a required density. It is known in the art that magnetic compression was implemented in limited scope in the ATC (Adiabatic Toroidal Compressor), though the concept has not been widely used since then.

Plasma stability—plasma may be subject to perturbative forces which may affect its equilibrium. In a stable plasma such perturbations will be damped or cancelled out resulting in plasma parameter stability, stability for a set period of time.

To increase plasma stability in FRC (where high energy ensues kinetic effects) a "stabilized pinch" was conceptualized: this concept added additional magnets to the outside of the chamber, which created a field that would be present in the plasma before the pinch discharge. In most concepts, the external field was relatively weak, and because a plasma is diamagnetic, the external magnetic field penetrated only the outer areas of the plasma. When the pinch discharge occurs and the plasma quickly contracts, this field became "frozen in" to the resulting filament, creating a strong field in its outer layers. This is also termed as "giving the plasma a backbone".

In the toroidal configuration, stabilization was slightly different: the layout would be the same as the stabilized pinch configuration, but the role of the two fields would be reversed. Instead of weak external fields providing stabilization and a strong pinch current responsible for confinement, in the new layout, the external magnets would be much more powerful in order to provide the majority of confinement, while the current would be much smaller and responsible for the stabilizing effect.

FRC—Field Reversed Configurations—moving current generates a magnetic field around itself. That magnetic field can self-contain the current. Field Reversed Configurations are loops of charged plasma. They make their own magnetic fields, self-containing themselves. On the inside of the loop, the plasma density is higher. An FRC is a structure made from plasma. FRC can be obtained in a toroidal machine as well as in a linear machine.

Various approaches to obtain FRC in linear machines are known. One such approach is by magnetic field ion mirroring at corresponding ends of a linear machine which causes the plasma to bounce back and forth between the bundled ends of the linear machine thereby forming an FRC in the middle of the machine. The two magnetic mirrors at the ends of the linear chamber face one another while a rotating magnetic field is applied on the outside of the tube chamber. This arrangement pulls the electrons in the plasma along—making a current which in turn self-generates a magnetic field forming an FRC in the middle of the plasma.

Another approach would be by firing two neutral beams of gas at the middle of the cylindrical chamber in a slight angle that will eventually cause the plasma to rotate and create an FRC. These beams also heat the plasma by collisions and are ionized to further increase the density.

Current solutions known in the art for creation of stable, efficient harvestable plasma present many problems and limitations. For instance, it is known in the art that sometimes the energy may leak out in huge bursts. Furthermore, in such situations the current is induced by continually increasing the current through an electromagnetic winding linked with a plasma torus: the plasma can be viewed as the secondary winding of a transformer. This is inherently perceived as a pulsed process because there is a limit to the current through the primary (there are also other limitations on long pulses). Current systems known in the art, must therefore either operate for short periods or rely on other means of heating and current drive. A drawback of such systems is that a sudden impulse or loss of heat can destroy a component. Such accidental losses cannot be tolerated in a complex, expensive and sometimes hazardous system.

Another drawback in the art is the physical size of the actual system needed to produce plasma. Toroidal designed systems as well as some currently designed linear machines present challenges in obtaining plasma products of scale.

Stability is a precondition for effective plasma creation and harvesting processes. Current design of toroidal machines as well as that of linear machines present challenges in obtaining a desired stability. It is well known in the art that linear axisymmetric systems can present high plasma stability due to its symmetry, nevertheless currently designed linear systems obtain heating by indirect methods (such as ion beams, RF antenna, lasers) thereby adversely affecting the efficiency of the plasma heating. These indirect methods require high degrees of input energy, thus adversely affecting the overall efficiency of the system.

Although relatively small axial cylindrical inertial electrical confiners are known in the art, such devices are not considered advantageous for plasma harvesting but, if at all, adequate for other technical tasks such as X-ray sources ('A Portable Neutron/tunable X-ray source based on inertial electrostatic confinement', Nucl. Instrum. Meth. Physics Res. A 422, 16-20, 1999).

There is a further need to provide a system and method configured to cope and mitigate said drawbacks and provide additional advantages.

SUMMARY OF THE INVENTION

The present invention provides a system and method for creating a local self-generated magnetic field arranged to contribute to a substantially stable plasma and ion heating mechanism. Various combinations of such arrangement provide for facilitation of high efficiency plasma processes (such as neutron sources, extreme UV, etching process, etc.).

The present invention substantially introduces the following aspects: plasma confinement; ion and/or electron heating in plasma; density increasing of plasma; high or extremely high stability of plasma; highly stable for relatively long periods of time (magnitude of milliseconds) plasma; and a mostly axial-symmetric chamber design. A relatively long-term stable plasma is termed herein as Super Stable Confined Plasma (SSCP). The implementation of various combinations, partially or wholly, of these aspects of the present invention facilitates economical and highly scalable efficient plasma and/or ion heating processes.

The present invention suggests a system and method which provides a chamber cross-sectional multi-stage plasma arrangement characterized by escalating charge movement towards chamber center axis through one or more escalation stages contributing to the heating of the plasma, the centering of the plasma on the chamber axis, and creating rotation of the plasma therein. Rotation of the plasma around its axis induces a self-generated magnetic field, which in turn increases plasma stability and confinement (not un-similar to the well-known toroidal pinch effect). Some of the said stages of the multi-stage arrangement may be created by physical elements and components while others may be induced or generated by externally applying magnetic and/or electric fields or their combinations and/or by injection of electrons, ions or other plasma.

The following embodiments and aspects thereof are described and illustrated in conjunction with systems, devices and methods which are meant to be exemplary and illustrative, not limiting in scope. In various embodiments, one or more of the above-described problems have been reduced or eliminated, while other embodiments are directed to other advantages or improvements.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show details of an embodiment in more detail than is necessary for a fundamental understanding of the invention.

In the Figures:

FIG. 5A-5B constitute schematic examples of magnetic and electric fields obtainable upon operation of the high efficiency plasma system and method, according to some embodiment of the invention.

DETAILED DESCRIPTION OF SOME EMBODIMENTS AND EXAMPLES

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "controlling" "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

The term "controller", as used herein, refers to any type of computing platform or component that may be provisioned with a Central Processing Unit (CPU) or microprocessors, and may be provisioned with several input/output (I/O) ports, for example, a general-purpose computer such as a personal computer, laptop, tablet, mobile cellular phone, controller chip, SoC or a cloud computing system.

Unless explicitly stated, the method embodiments described herein are not constrained to a particular order or sequence. Additionally, some of the described method embodiments or elements thereof can occur or be performed simultaneously, at the same point in time, or concurrently.

Figure 1:
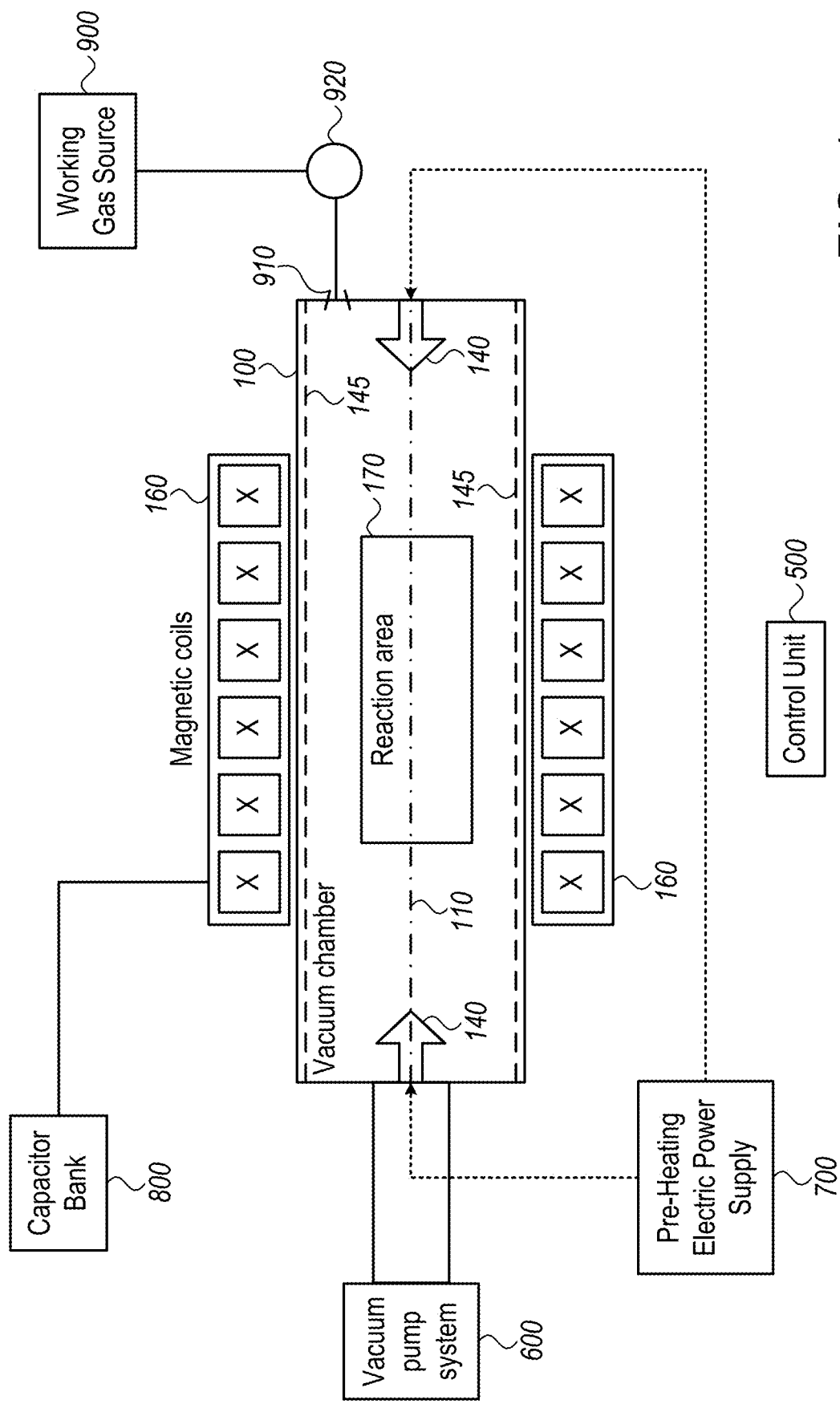
FIG. 1 constitutes a schematic view of the high efficiency plasma system, according to some embodiments of the invention.

According to one aspect of the invention, an axial-symmetric shape of the plasma is maintained stable and coaxial by a combination of part or all of the following discussed system components or elements, as schematically exemplified in FIG. 1, substantially consisting of—

(i) a cylindrical chamber (100) having substantially reduced internal pressure;
(ii) inner anode element (145)
(iii) an electrode (140) positioned at each end of tubular chamber connected to external power supply;
(iv) external solenoids or magnets or combination thereof (160);
(v) capacitor banks (for e/m pulse) external to chamber (800);
(vi) controlling unit (500);
(vii) very high quality vacuum (characteristically of $10^{-3}$-$10^{-7}$ Torr) pumping system (600);
(viii) pre-heating electric power supply (700).
(ix) working gas source (900) coupled with a control valve (920) connected to a gas inlet (910).

Figure 2A:
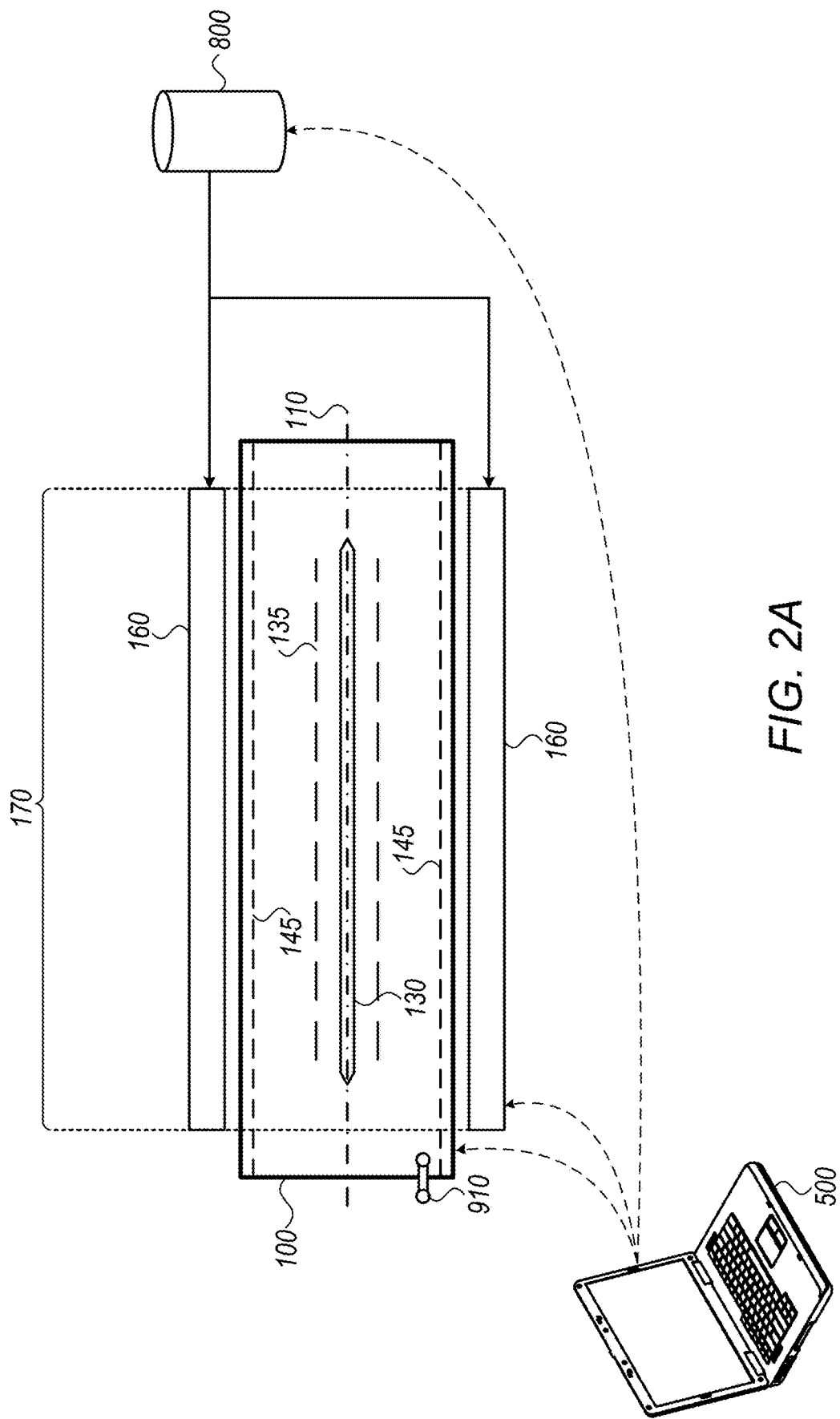
FIG. 2A-2B constitute schematic views of the high efficiency plasma system chamber, according to some embodiments of the invention.

Reference is made to FIG. 2A whereby tubular chamber (100) is optionally combined with an inner anode element (145) (proximal to the chamber's internal skin), as initial outer stage to inner cascaded stages of external and inner generated or induced magnetic and electrical fields. While making reference to FIG. 2B wherein optional electrodes (140) at ends of tubular chamber act as cathodes in ionization process.

Figure 3A:
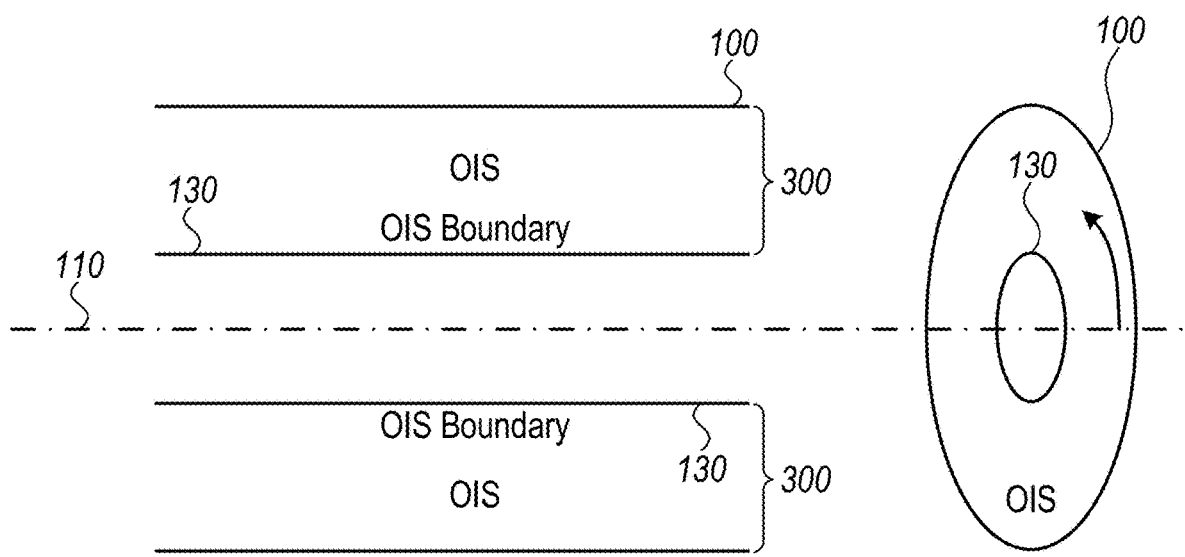
FIG. 3A-3B constitute schematic views of the ionization stages in the high efficiency plasma system chamber reaction area, according to some embodiments of the invention.
Figure 3B:
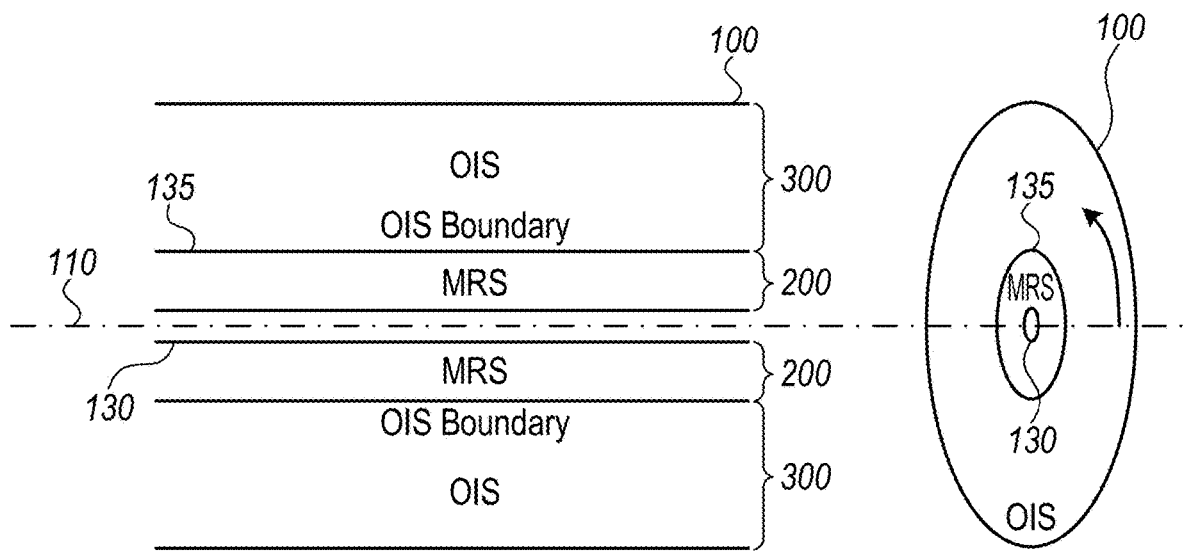

Whereas in one embodiment, at least one inner tubular electric field is created by a conductive apparatus (135) or by "virtual" induced plasma (130) concentrically arranged on tubular chamber axis, wherein such inner field acts as a cascaded stage manipulating the ionization. Making reference to FIG. 3A showing the facilitation of Outer Ionization Stage (OIS) (300) which contributes to a high rate of ionization of the working gas originating from working gas source (900) controllably injected into chamber (100) through control valve (920) via gas inlet (910). This ionization is due to the relatively high electric field (typically ~2-7 kV but also much larger ranges such as ~2-20 kV or even larger) in outer cascade. The coupling of such ionization with rotation of the electrons about the chamber axis (110) due to the externally applied electric field (from pre-heating power supply (700)) and magnetic field (through magnetic coil or solenoids (160) coupled with capacitor bank (800)) contributes to the heating of the ions in the OIS (300) and their acceleration towards the chamber axis (110). Such acceleration which in itself contributes to gradient of a magnetic field leads to a compression of ions at and about chamber axis (110) and thereby contributing to the creation of stable plasma (130) at reaction area (170), in accordance with controller unit (500) directions. Making reference to FIG. 3B showing the facilitation of one embodiment, wherein at least two additional inner tubular electric fields are created by conductive apparatus (135) or by "virtual" plasma inducement concentrically arranged on tubular chamber axis (110), such inner fields act as additional cascaded stages manipulating the ionization through Outer Ionization Stage (OIS) (300) and Main Reaction Stage (MRS) (200). The upper parts of the cascaded stages, the OIS, contribute to a high rate of ionization of the working gas. This ionization is due to the relatively high electric field (typically ~2-7 kV but also much larger ranges such as ~2-20 kV or even larger) generated in outer cascade. Electric field at inner cascade stage, at the MRS, is to be of much larger magnitude (typically ~10-35 kV but also much larger ranges such as ~10-100 kV or even larger).

Figure 4A:
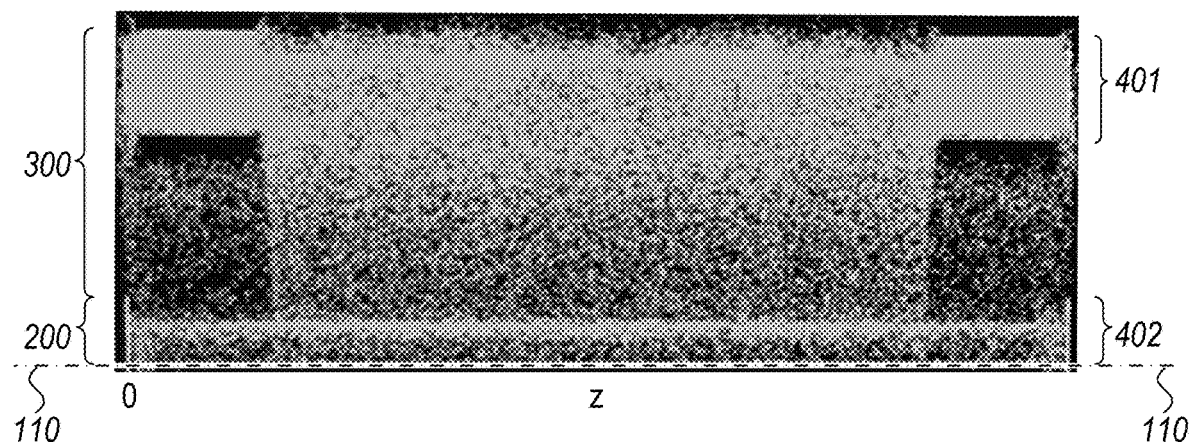
FIG. 4A depicts axial section of Particle-In-Cell simulation results of ion acceleration in the high efficiency plasma system chamber reaction area, according to some embodiments of the invention.
Figure 4B:
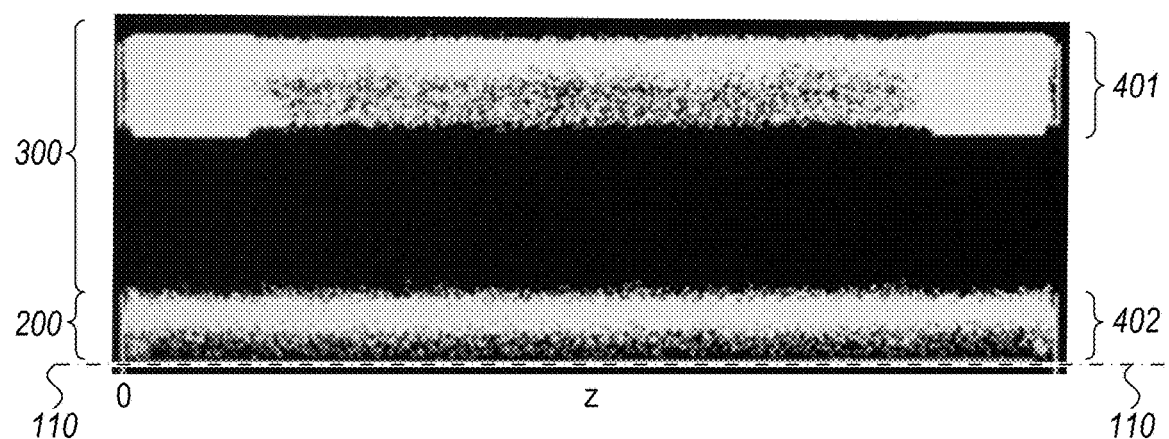
FIG. 4B depicts axial section of Particle-In-Cell simulation results of electron acceleration in the high efficiency plasma system chamber reaction area, according to some embodiments of the invention.
Figure 4C:
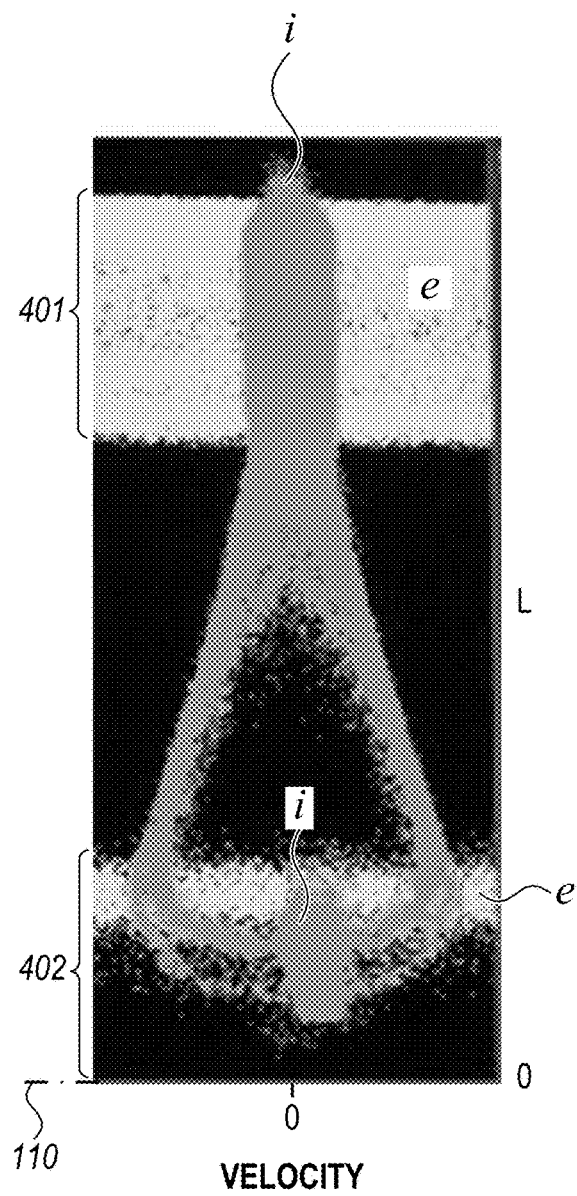
FIG. 4C depicts cross section of Particle-In-Cell simulation results of ion radial direction velocity in the high efficiency plasma system chamber reaction area, according to some embodiments of the invention.
Figure 4D:
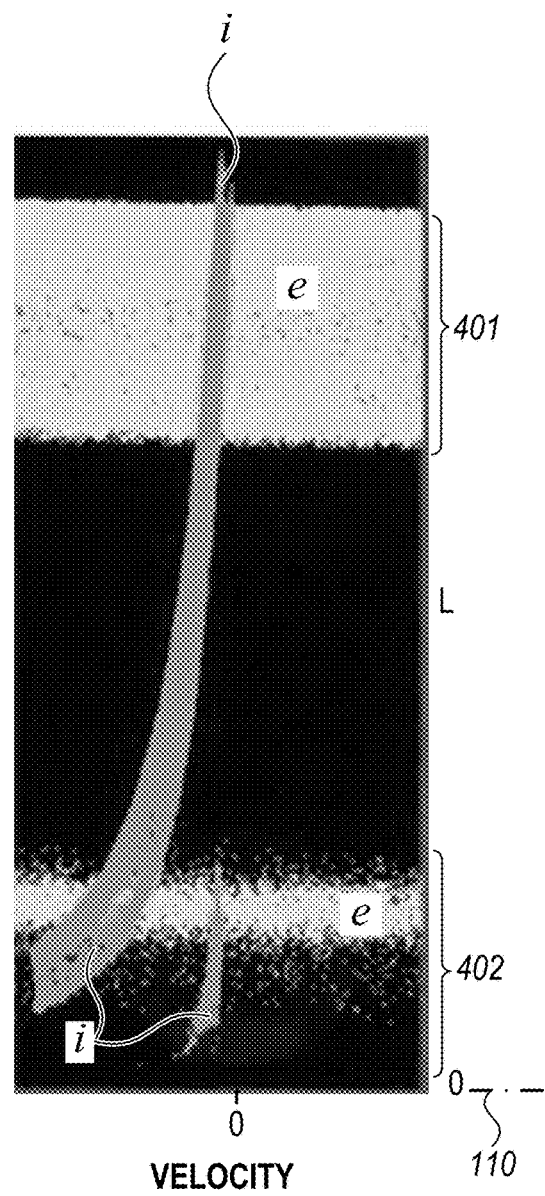
FIG. 4D depicts cross section of Particle-In-Cell simulation results of ion phi direction velocity in the high efficiency plasma system chamber reaction area, according to some embodiments of the invention.

Such arrangements ensue electrons emitted from said optional electrodes (140) at ends of tubular chamber to create a "virtual cathode" (130) at axis of tubular chamber affected by externally applied magnetic and electrical fields coupled with the internally generated magnetic and electrical fields, bringing about magnetic and electrical forces on gas ions, in accordance with controller directions. As is demonstrated to be obtainable in FIG. 4A through FIG. 4D depicting certain Particle-In-Cell (PIC) simulation results conducted according to some embodiments of the invention. It being understood by those skilled in the art that PIC simulations are acceptable investigation and demonstration for plasma simulation techniques. FIG. 4A shows PIC simulation results of ion acceleration in the chamber (100) radial direction while FIG. 4B shows the confining of electrons to two stages of potential well: at area (401) proximal to chamber wall; and at area (402) of chamber axis (110). FIG. 4A and FIG. 4B exemplify the phenomena that ions are less affected by the magnetic field proportionate to their mass which is much heavier than that of the electrons. Thereby the said arrangement would facilitate the movement of ions between areas (401) and (402) as shown in FIG. 4A, while electrons substantially remain situated either in areas (401) or (402) as shown in FIG. 4B. Such PIC simulation demonstrates the facilitation of the OIS (300) and "virtual cathode" (130) at axis of tubular chamber creating the MRS (200). The ion movement characteristic ion (i) radial direction velocity is shown in FIG. 4C and ion (i) Phi direction (rotational) velocity in FIG. 4D, both shown against the stagnant electrons (e) in areas (401) and (402) accordingly. It would be appreciated by a person skilled in the art that such PIC simulations demonstrate the increased ion velocity, both radially as well as or alternatively rotationally, which is indicative of the high ion temperature obtainable at the chamber axis (110) area in the said arrangement.

According to some embodiments, a cylindrical chamber is used to encapsulate the process. The chamber walls may be made of various materials (varying from metals, ceramics, pyrex, glass and others). Different materials may have different advantages or disadvantages by way of strength, temperature conveyance, isolation, radiation "transparency", "opacity" and other characteristics. According to some embodiments, chamber walls are conducive and may act as electrode (145) or as a stage in the cascade of magnetic and electrical fields.

According to some embodiments, cylindrical chamber (100) is initially highly depressurized to very high quality vacuum conditions (characteristically of $10^{-3}$-$10^{-7}$ Torr) prior to gas injection through gas inlet (910) connected to a control valve (920) in order to prevent interference/contamination by undesired particles of residual gasses. According to some embodiments, cylindrical chamber is filled with a working gas (Xenon/Argon/hydrogen/deuterium/or other relevant gases or combinations thereof depending on the plasma process to be implemented) at a predefined pressure. Gas in the chamber is ionized and effectively manipulated by applied magnetic and electric fields arranged according to the invention.

Figure 2B:
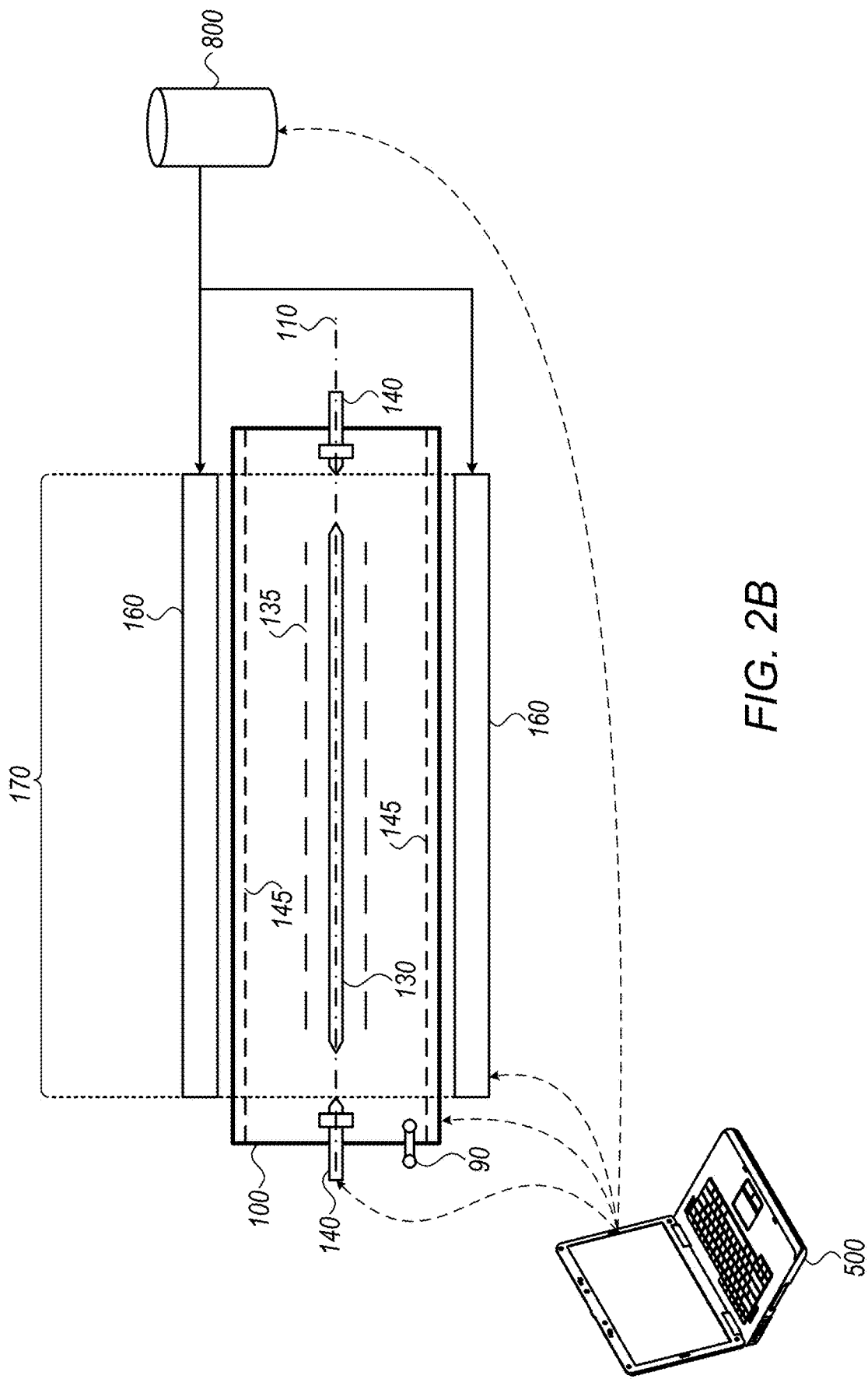

According to some embodiments, the outer circumference of cylinder chamber (100) contains an active conducting component which acts as an anode allowing for the induction of a radial electric field of high voltage that ionizes the gas in the chamber. Referring to FIGS. 2A and 2B this component of the outer chamber (100) is the first stage of the multi-stage anode arrangement an example of which is shown in FIG. 2 which comprises several stages of plasma some of which may be physical and others may be "virtually" induced. According to some embodiments of the invention, referring to FIG. 3, such stages are radially arranged in relation to the chamber axis (110), each stage causing the acceleration of ions towards central axis in the area of which plasma (130) is concentrated.

It being appreciated by a person skilled in the art that ion acceleration may be obtained by various magnetic and electrical fields and their combinations, by way of an unlimiting example, making reference to FIG. 1, according to some embodiments, the reaction area (170) of the chamber circumference (100) is surrounded by a fairly medium to low power magnet or magnetic coil (160) (typically of a magnitude of ~0.1-0.5 Tesla or larger such as ~0.1-2 Tesla). According to some embodiments, such MRS is evident at the longitudinal center of chamber and, according to some other embodiments, active part (170) may extend to ends of tubular chamber (100) such as in area of electrodes (140). Substantially, such arrangement allows for the application of a current pulse in the coil which causes a magnetic pulse which in turn causes the plasma in the chamber to compress and heat to higher efficiency of plasma processes.

According to some embodiments, maintainability of the system is improved due to its relatively small size. Pulse operated system enjoy prolonged life span of materials which otherwise would deteriorate under continuous operation—thus reducing MTBF and due replacements;

According to some embodiments, a multi-stage ionization is outlined in FIG. 3A showing the internal area in which the axi-distal edge of the cylindrical grid element or of the "virtual mesh grid" operate as the boundary and the cathode of the outer ionization stage ("OIS") steps-up the plasma ionization level in the chamber which eventually increases the ion flux towards the axis of cylinder.

According to some embodiments, a multi-stage ionization is outlined in FIG. 3B showing the internal area in which the axi-distal edge of the cylindrical grid element or of the "virtual mesh grid" operate as the boundary and the cathode of the outer ionization stage ("OIS") which steps-up the plasma ionization level in the chamber which eventually increases the ion flux towards the material cathode or "virtual cathode" passing through the Main Reaction Stage (MRS) at the axis of cylinder. According to some embodiments, as outlined in FIG. 3A, the creation of the MRS and the "virtual cathode" coincide thereby increasing the density of ions in the axis creating a higher probability of reaction between accelerated ions from the OIS stage with the ions in the combined MRS and "virtual cathode" volume. Ions passing under such conditions (per FIG. 3A or FIG. 3B) contribute to the creation of the designated plasma processes.

According to some embodiments, internal volume where plasma is concentrated, is surrounded by an internal metallic grid cylinder (135) (substantially lower than 15% mesh density and typically less than 5% mesh density). Metallic grid cylinder may be made of various materials (such as any conducting material that can withstand heat and has low absorption of water or other substances and will not contaminate the chamber, such as stainless steel, tungsten, molybdenum, and other materials) and be in various shapes and patterns (such as helical spring shape, perforated, slotted, whole, flute, etc. as some such examples as experimented are shown in FIG. 10A through 10D) (such internal cylindrical element is referred to hereinafter as "mesh cylinder" or "cylindrical grid element").

According to some embodiments, instead of or in addition to the cylindrical grid element, an electromagnetic field may be locally generated producing a similar effect to that of a mesh cylinder (135) by manipulation of the multi-stage anode arrangement.

Figure 5B:
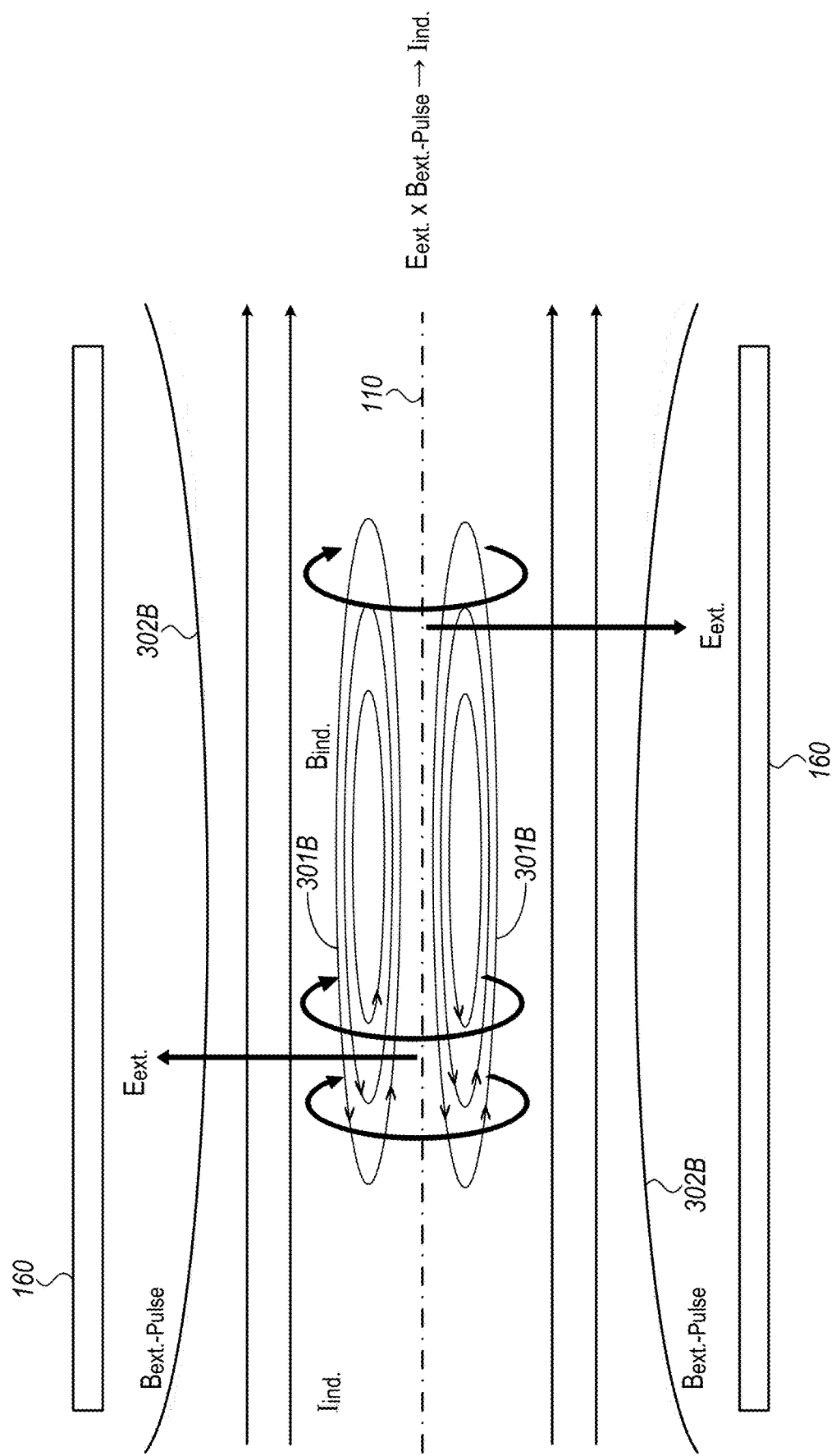
Figure 6A:
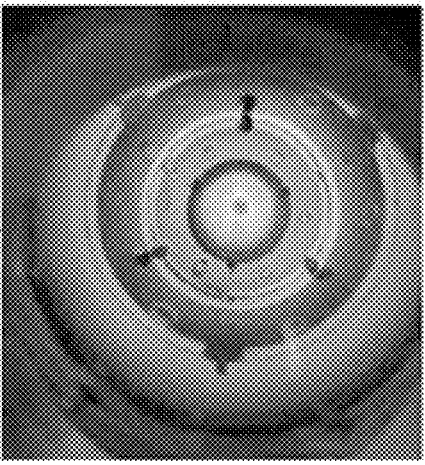
FIG. 6A is a photographic image of a test apparatus according to some embodiment of the invention showing the high efficiency plasma system chamber reaction area looking along the chamber's axis line, demonstrating plasma circulation in a lower magnetic field.
Figure 6B:
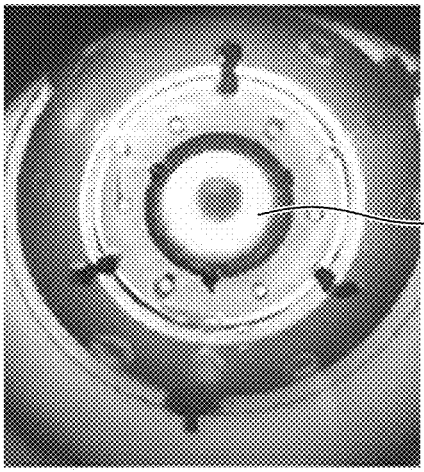
FIG. 6B is a photographic image of a test apparatus according to some embodiment of the invention showing the high efficiency plasma system chamber reaction area looking along the chamber's axis line, demonstrating plasma circulation in a higher magnetic field.
Figure 7:
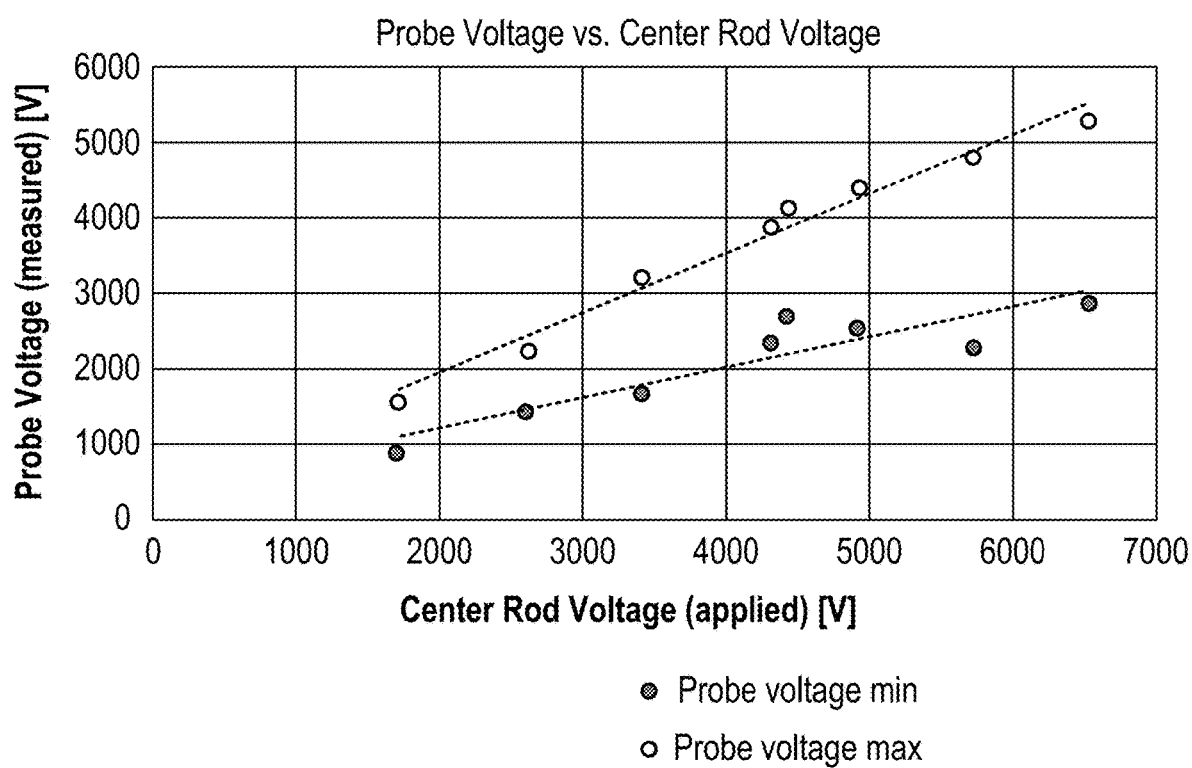
FIG. 7 is a chart of voltage measured in probes used in a test apparatus according to some embodiment of the invention versus externally applied voltage values.

According to some embodiments, said cylindrical grid elements plays also the role of an anode for the MRS. The result being a cascade of stages the first of which is the external chamber's cylinder acting as an anode and the next being the cylindrical grid element anode. The next stage being a material cathode or a "virtual cathode" on axis of chamber cylinder in area of plasma, such "cathodal" character resulting from the application of the prior stages coupled with the electron emission electrodes at ends of active tubular chamber. The cross-product of the linear magnetic field flux in the chamber with a radial electric field within the chamber results in the creation of a strong internal magnetic field as schematically exemplified in FIG. 5A. This self-induced magnetic field (301) has closed field lines within the chamber. Such cross-product contributes to the contortion and coaxilization of the plasma without investment of substantially additional energy. Adjusting and optimizing the electric and magnetic fields and their cross-product creates strong confinement and thereby obtains high-pressure high-density highly-stable plasma (not unsimilar to the conventional FRC effect). According to some embodiments, making reference to FIG. 5B, whereupon additionally an external magnetic pulse 302A (typically of magnitude 3-10 Tesla or larger) would increase the induced current, which is the product of the external magnetic field pulse (302A) and the external electric field, apparent in the chamber axis (110) thereby contorting the axial plasma contributing to an SSCP effect presenting a longitudinally concentrate of induced magnetic field (301A). Such effect is also evident in photographic images of a working test apparatus arranged according to the invention presented in FIG. 6A and FIG. 6B. FIG. 6A and FIG. 6B are photographic images of a system according to the invention showing the plasma circulating around the axis of the chamber under different external magnetic field application. Evidently, the plasma (300B) radius is larger under the stronger externally applied magnetic field and smaller radius (300A) under a lower externally applied magnetic field. A person skilled in the art would appreciate that the rotational energy is effectuated by the external radial electric field and its product with the external magnetic field (ExB) in the z direction (axial). Such change of the external magnetic field would characteristically dominantly contribute to the creation of the SSCP effect as visually demonstrated in the plasma contortion shown in FIG. 6A and FIG. 6B. Furthermore, a person skilled in the art would appreciate that applying a strong pulse of external magnetic field will create the effect substantially equivalent to a Pinch compressing and overcoming the centrifugal forces of the plasma thereby bringing about the heating of the plasma as well as increasing the plasma density in the MRS and bringing the plasma to highly energetic parameters. An example of obtaining such energetic parameters is show in FIG. 7 which presents a chart of voltage measured in probes versus externally applied voltage values as per test apparatus according to some embodiment of the invention. The test apparatus comprised of two Langmuir probes one of which located at bottom area of OIS and the other at the top of MRS area. The probes measured the plasma electric potential. FIG. 7 shows the high correlation between applying various heating/acceleration voltages to the measured plasma voltage which indicates the actual heating of the plasma at the MRS (200).

The acceleration of ions ensues an increase of temperature. This acceleration is a direct result of the static electric field which is considered to be an efficient method to provide kinetic energy to a charged particle. According to some embodiments, using the radial electric field creates an innate axisymmetric heating mechanism having a high degree of uniformity, which maintains the axial symmetry which is crucial for plasma stability.

A person skilled in the art would appreciate that plasma density may be increased by injecting additional gas into chamber. According to some embodiments, gas injection can be achieved through the cylinder wall (100) by gas inlet connected to a proportional valve (920). Controlling the injection of the gas through the chamber wall may further contribute to the effective distribution of the charged gas by way of influencing density disbursements in chamber volume.

According to some embodiments, electrodes (made of high temperature resistant materials, such as Tungsten/Molybdenum/or the like) are coaxially positioned at ends of tubular chamber and connected to high negative voltage. Such designs may be used to contribute to the electric field at the chamber axis and/or to facilitate as an electron emitting source. According to some embodiments, such electrodes can be either passive wherein heating is by the plasma itself from electrode tip (141) or active wherein the heating is externally induced in the electrode and thus actively causing emission of electrons from active electrode tip (141') (creating an "electron gun").

Figure 8A:
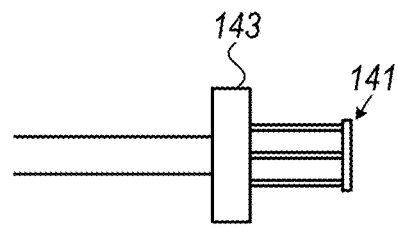
FIG. 8A-8G show examples of electrode design according to some embodiments of the invention.
Figure 8B:
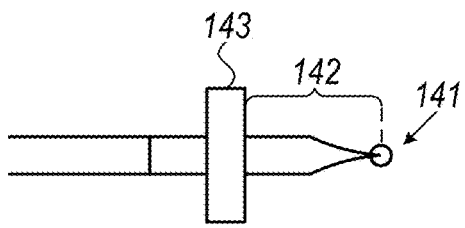
Figure 8C:
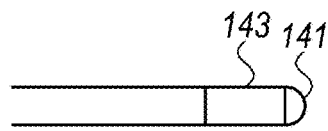
Figure 8D:
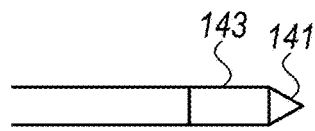
Figure 8E:
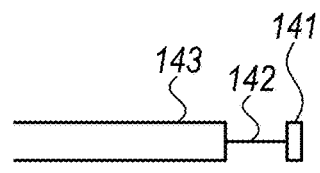
Figure 8F:
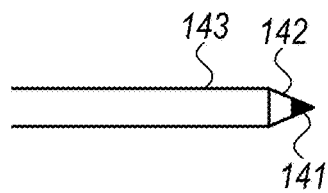
Figure 8G:
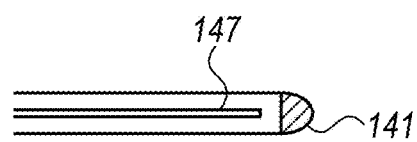

According to some embodiments, said electrodes are characterized by a varying gradients and/or gradual changing radii and/or varying planes design comprising of several phases of different magnitude scale. Reference is made to FIG. 8A through 8G showing some such electrodes. According to some embodiments such electrodes as shown in FIGS. 8B and 8F may be characterized by three major areas of said phases: a relatively large magnitude phase (143); a mid-section phase tapering towards tip (142); and a tip section phase (141). According to other embodiments, additional alternate electrode designs are implementable (as may be shown in FIGS. 8A, 8C, 8D and 8E). Making reference to FIG. 8G showing yet another electrode design combined with an internal heating element (147) which when heated instigates high rate of electron emission from electrode tip (141).

Figure 9:
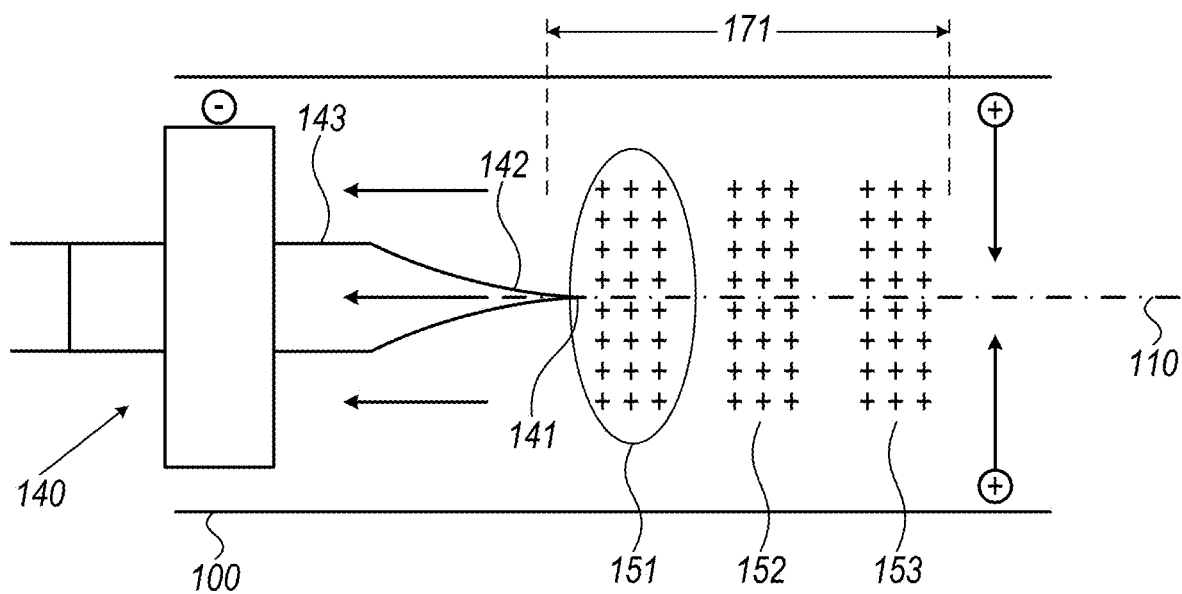
FIG. 9 constitutes a schematic example of obtainment of ion mirroring obtainable upon operation of the high efficiency plasma system and method, according to some embodiment of the invention.
Figure 10A:
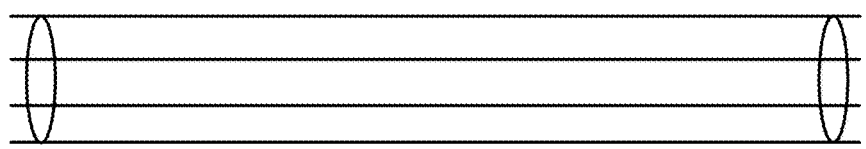
FIG. 10A-10D show examples of mesh cylinder design according to some embodiments of the invention.
Figure 10B:
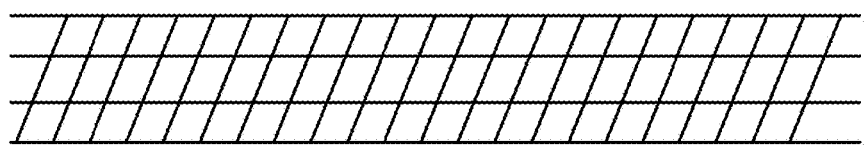
Figure 10C:
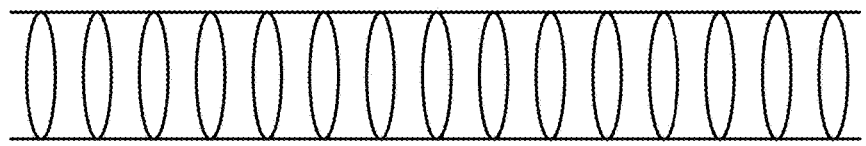
Figure 10D:
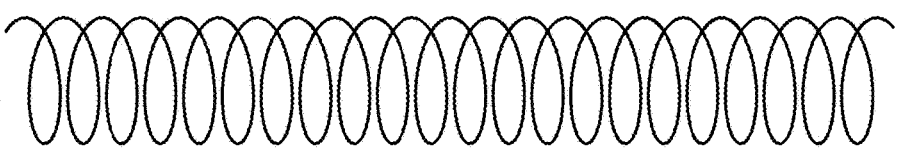

Making reference to FIG. 9, an active electrode emits electrons from active tip (141). Such active emission is obtained by external heating element (700). The heat concentrated at the tip phase (141) causes the emission of electrons in a thermionic emission process. Thus, according to some embodiments of the invention, the emitted electrons are longitudinally forced by the electric field and held by the magnetic field towards the middle of the chamber thus contributing to the creation of an initial "virtual cathode" (130) and thereafter sustaining it at a substantially steady state.

According to some embodiments, the shape and structure of the electrodes immersed within the volume of the chamber creates an electron "gun" source. According to some embodiments, the shape and structure of the electrodes immersed within the volume of the chamber creates an "electric mirror" or "electric deflector" which is obtained by the said unique specific geometric shapes according to the invention such as per FIG. 8A through 8G. Whereas, a person skilled in the art would appreciate that such effects may be obtained by other specific multi-phased electrode designs in accordance with the invention.

By way of un-limiting example, reference is made to FIG. 9 which shows the electric field back mirror (171) created when placing coaxially immersed electrode (140) in chamber (100) aligned with its axis (110). In such example the plasma phase at its distal ends in area of electrode tip (141), placed at each end of chamber, accumulates a volume of ions. Making reference to FIG. 9 ion clouds (151), (152) and (153) which are not captured into the main plasma flux have a containment effect on the plasma shape and form in the chamber. Such clouds are considered to have a "mirroring"

constraining effect whereby ions in trajectory towards ends of tubular chamber are contained by the electron cloud (as schematically shown in FIG. 9). According to some embodiments, such mirroring is obtained by the combination of the multi stage cascade arrangement in the chamber together with said multi-phased electrodes, without installing actual magnets at ends of linear design chamber to obtain a "magnetic mirroring effect" as may be suggested in other cylindrical designs. According to some embodiments, it is enough to rely on the electron emission from the plasma distal electrode phase. The axial location of the "ion mirror" will vary in accordance with many parameters, including the actual design of the phases of the electrode but in any case it is in a distance that creates the equilibrium between the ions and electrons that eventually establishes the "ion mirror".

According to some embodiments, electron emitting electrodes are characterized by having at least two phases whereby phase arrangement is designed to induce ion and electron "clouds" in vicinity of electrode, whereby at least one phase is considerably larger in diameter in comparison with the other phase of the electrode.

According to some embodiments, electron emitting electrodes are characterized by having at least two phases whereby phase arrangement is designed to induce ion and electron "clouds" in vicinity of electrode, whereby through some of the phases electric current is driven and others are electro-statically charged.

According to some embodiments, electron emitting electrodes are arranged in a manner generating "electric mirrors" within chamber substantially reducing ion "escape" at ends of tubular chamber.

Operation of the currently contemplated system requires relatively small energy level input from external sources (compared to conventional systems) both for heating and for magnetic field build-up. A person skilled in the art would appreciate that implementing the unique design criteria derived from the approaches described hereinabove will present a highly efficient system.

Without limitation of any of hereinabove, a person skilled in the art would appreciate that the harvestable plasma obtainable in accordance with the suggested system and method may be used as a neutron source, as a source for extreme UV, in an etching process, energy harvesting and/or generally in or for high density high temperature plasma fusion processes.

Although the present invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

The invention claimed is:

1. A method for stably confining a plasma in a cylindrical chamber comprising the steps of:
    injecting a gas into the cylindrical chamber;
    applying a magnetic field about a portion of the cylindrical chamber;
    applying an electric potential between a first anode and at least one cathode to create a radial electric field within the cylindrical chamber, wherein the first anode is generally radially arranged around a central axis of the cylindrical chamber and in proximity to a wall of the cylindrical chamber, and wherein the at least one cathode is located on the central axis of the cylindrical chamber and at a distal end of the cylindrical chamber, wherein a second anode comprising a cylindrical metallic mesh grid is generally radially arranged around the central axis of the cylindrical chamber between the first anode and the central axis of the cylindrical chamber; and
    injecting electrons into the chamber from the at least one cathode to create a virtual cathode along the central axis of the cylindrical chamber;
    wherein, the magnetic field and the radial electrical field accelerate ion movement toward the central axis of the cylindrical chamber to facilitate ion collisions, whereby an increase of ion movement towards the central axis of the cylindrical chamber substantially contributes to an ion heating and to a rotation of the plasma therein, thereby increasing a stability and a confinement of the plasma.

2. The method of claim 1 wherein the ion heating is further increased by adiabatic compression.

3. The method of claim 1, further comprising the following steps:
    a. creating a substantially reduced internal pressure in the cylindrical chamber; and
    creating ion clouds at a distal end of the cylindrical chamber by injecting electrons from the at least one cathode
    wherein radial ion acceleration in the cylindrical chamber from the wall of the cylindrical chamber to the central axis of the cylindrical chamber is affected whereby ion collisions are facilitated at the central axis of the cylindrical chamber.

4. The method of claim 3 wherein an ion density in the cylindrical chamber is enhanced by inserting a gas proximal to the chamber wall.

5. The method of claim 1 wherein the acceleration of ion movement is enhanced by the second anode radially arranged along the central axis of the cylindrical chamber and closer to the central axis of the cylindrical chamber than the first anode.

6. The method of claim 5 wherein the second anode is a conductive apparatus placed at a radius from the central axis of the cylindrical chamber proximal to a main reaction stage.

7. The method of claim 6 wherein the second anode has mesh density in the range of 0% to 15% and less than 5%.

8. The method of claim 6 wherein the conductive apparatus is made of high temperature resistant materials such as stainless steel, tungsten or molybdenum.

9. The method of claim 5 wherein the second anode is placed at an axial plasma boundary area between an outer ionization stage and a main reaction stage.

10. The method of claim 1 wherein the stably confined plasma is harvested as a neutron, UV, extreme UV or energy source.

11. The method of claim 1 wherein a means for applying the magnetic field about a portion of the cylindrical chamber is coupled with a capacitor bank.

12. The method of claim 11 wherein a substantially long current pulse is applied to the means for applying the magnetic field about a portion of the cylindrical chamber.

13. The method of claim 1 wherein plasma stability and confinement is improved by controlling the gas injection into the cylindrical chamber during operation of the method.

14. The method of claim 1 wherein the radial electric field at the central axis of the cylindrical chamber is affected by the at least one cathode.

15. The method of claim 14 wherein heat concentrated at a tip of the at least one cathode causes an additional emission of electrons in a thermionic emission process affecting the strength of the radial electric field and wherein ions and electrons are held by the magnetic field towards the midpoint between distal ends of the cylindrical chamber.

16. A system for stably confining a plasma, comprising:
a. a cylindrical chamber;
b. a first anode in proximity of a wall of the cylindrical chamber;
c. at least one cathode at a distal end of the cylindrical chamber and at a central axis of the cylindrical chamber;
d. a means for generating a magnetic field in the cylindrical chamber;
e. capacitor banks dischargeable into a chamber volume;
f. a pre-heating electric power supply coupled with the at least one cathode in the cylindrical chamber;
g. a working gas source coupled into the cylindrical chamber;
h. a second anode comprising a cylindrical metallic mesh grid and generally radially arranged around the central axis of the cylindrical chamber between the first anode and the central axis of the cylindrical chamber;
i. a controlling unit connected to the first anode, the second anode, the at least one cathode, the generating means, the capacitor banks, the pre-heating electric power supply, and the working gas source;

whereby the control unit controls a first voltage applied between the first anode and the at least one cathode, a second voltage applied between the second anode and the at least one cathode, a generated magnetic field, the working gas, and a power applied to the pre-heating electric power supply to produce ion movement towards the central axis of the cylindrical chamber and to heat ions in the cylindrical chamber and also to produce a rotation of the plasma therein, bringing about an increase of stability and a confinement of the plasma.

* * * * *